United States Patent
Kuraie

(10) Patent No.: US 7,484,852 B2
(45) Date of Patent: Feb. 3, 2009

(54) SYSTEM FOR COOLING HEAT EMISSION PORTIONS IN A PROJECTOR

(75) Inventor: Shinsuke Kuraie, Habikino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/677,501

(22) Filed: Feb. 21, 2007

(65) Prior Publication Data
US 2007/0285623 A1    Dec. 13, 2007

(30) Foreign Application Priority Data
Feb. 24, 2006  (JP) ............................. 2006-047889
Jan. 9, 2007   (JP) ............................. 2007-001452

(51) Int. Cl.
G03B 21/18  (2006.01)
G03B 21/26  (2006.01)
G03B 21/20  (2006.01)
G03B 21/14  (2006.01)
G03B 21/22  (2006.01)
H04N 5/74   (2006.01)
F21V 29/00  (2006.01)

(52) U.S. Cl. ............................. 353/57; 353/60; 353/85; 353/119; 348/748; 362/294

(58) Field of Classification Search ................. 353/57, 353/58, 60, 61, 85, 119; 349/161; 348/748; 362/294; 361/695; 62/259.2
See application file for complete search history.

(56) References Cited

U.S. PATENT DOCUMENTS 7,014,320 B2 * 3/2006 Shiraishi ...................... 353/57

2006/0067049 A1 * 3/2006 Horiguchi et al. ........... 361/695

FOREIGN PATENT DOCUMENTS

| JP | A 9-90511 | 4/1997 |
|---|---|---|
| JP | A 11-95673 | 4/1999 |
| JP | A 2000-19646 | 1/2000 |
| JP | A 2000-112371 | 4/2000 |
| JP | A 2000-221599 | 8/2000 |
| JP | A 2001-13589 | 1/2001 |
| JP | A 2001-330890 | 11/2001 |
| JP | A 2003-107582 | 4/2003 |
| JP | A 2004-4942 | 1/2004 |
| JP | A 2004-12769 | 1/2004 |
| JP | A 2004-151648 | 5/2004 |
| JP | A 2005-196230 | 7/2005 |
| JP | A 2006-47961 | 2/2006 |

* cited by examiner

Primary Examiner—Melissa J Koval
(74) Attorney, Agent, or Firm—Oliff & Berridge, PLC

(57) ABSTRACT

A projector includes a light source unit that emits light, a lamp driving unit that supplies a driving power to the light source unit, a power supply unit that supplies a power to at least the lamp driving unit, a fan that circulates cooling air to the lamp driving unit and the power supply unit, a distribution unit that distributes air volumes of the cooling air by the fan to the lamp driving unit and the power supply unit, and changes the air volumes of the cooling air distributed to the lamp driving unit and the power supply unit, and a distribution control unit that performs driving control on the distribution unit so as to change the air volumes of the cooling air distributed to the lamp driving unit and the power supply unit in accordance with the driving power supplied to the light source unit.

7 Claims, 10 Drawing Sheets

SYSTEM FOR COOLING HEAT EMISSION PORTIONS IN A PROJECTOR

BACKGROUND

1. Technical Field

The present invention relates to a projector that projects an image to be enlarged, and more particularly, to a technology for cooling down heat emission portions in a projector.

2. Related Art

A projector has been known in which a discharge lamp, such as a high pressure discharge lamp or a metal halide lamp, is used as a light source, light emitted from the light source is modulated by light modulating elements according to an image signal, and the modulation light displaying the modulated image is projected to be enlarged. A plurality of heat emission portions exist in the projector. Specifically, as the plurality of heat emission portions, the projector includes the discharge lamp that functions as the light source, a lamp driving unit that turns on the discharge lamp and maintains a turned-on state of the discharge lamp, light modulating elements, such as transmissive liquid crystal light valves, and the power supply unit that supplies a power to the respective units of the projector. Further, a projector has been suggested in which a plurality of fans functioning as cooling units are provided such that temperatures of the heat emission portions do not exceed respective rated temperature values.

For example, a three-plate-type projector that has been disclosed in JP-A-2000-221599 has a structure in which exclusive cooling fans are respectively provided in a light source, light modulating elements, a lamp driving unit, and a power supply unit. In particular, in regards to the light modulating elements, an exclusive fan is provided for each of liquid crystal light valves for red, green, and blue. That is, three fans are provided therein. Further, if the plurality of fans includes a large-scaled fan that exhausts air heated by each heat emission portion when the plurality of fans blow the air to the outside of the projector, total seven cooling fans are provided in the projector.

FIG. 8 is a schematic plan view mainly illustrating a cooling structure in a projector according to the related art.

However, if seven fans are provided in one projector, the number of components is increased, the manufacturing cost is increased, and noises and power consumption may be increased. A projector 200 shown in FIG. 8 has been suggested in order to solve the above-described problems.

The projector 200 includes a fan F1 that cools down a light source unit 5, two fans F2 and F3 that cool down a light modulating unit 30 including three liquid crystal light valves 23R, 23G, and 23B, a fan F4 that simultaneously cools down a cower supply unit 40 and a lamp driving unit 45 as one set, and a fan F5 that exhausts air heated by each heat emission portion when the plurality of fans blow the air to the outside of the projector. That is, the projector 200 includes the five fans. In particular, in the projector, the power supply unit 40 and the lamp driving unit 45 are provided to be adjacent to each other as one set, and are simultaneously cooled down by one fan F4. Specifically, a cooling air Wa that is blown by the fan F4 is substantially equally distributed to a cooling air W1 toward the power supply unit 40 and a cooling air W2 toward the lamp driving unit 45.

According to this structure, the projector 200 can perform a necessary cooling process while reducing the number of fans, which reduces the noises and the power consumption.

Further, the projector 200 is provided such that a plurality of color modes can be set according to projection environments. The projector 200 adjusts luminance of the light source unit 5 according to a selected color mode. Examples of the color modes include a dynamic mode which is suitable for viewing images in bright rooms, or a theater mode which is suitable for enjoying images of great depth in dark illumination environments. When the dynamic mode is selected, a driving power of the discharge lamp 1 from the light source unit 5 is increased to increase luminance. In contrast, when the theater mode is set, the driving power of the discharge lamp 1 is decreased to decrease the luminance.

As such, since an amount of power supplied to the discharge lamp 1 is changed according to the selected color mode, amounts of heat emitted from the power supply unit 40 and the lamp driving unit 45 are also changed. For this reason, the revolution number of the fan F4 is also changed according to the selected color mode, such that the power supply unit 40 and the lamp driving unit 45 are appropriately cooled down.

However, in the projector 200 according to the related art, the power supply unit 40 and the lamp driving unit 45 are cooled down in a state where the air volumes of the blowing winds by the one fan F4 are substantially equally distributed to the power supply unit 40 and the lamp driving unit 45. For this reason, if the temperature difference between the power supply unit 40 and the lamp driving unit 45 is generated, it is necessary to drive the fan F4 according to the temperature of the side having the high temperature between the power supply unit 40 and the lamp driving unit 45. As a result, the revolution number of the fan F4 is increased, which increases the noises and the driving power.

FIG. 9 is a graph illustrating temperature states of a power supply unit and a lamp driving unit according to a driving power (luminance) of a light source unit in a projector according to the related art.

In a graph g, a horizontal axis indicates a driving power (luminance) of the discharge lamp 1, a longitudinal axis (left side) indicates temperatures of the power supply unit 40 and the lamp driving unit 45, and a longitudinal axis (right side) indicates a driving voltage of the fan F4. The graphs shown by a solid line and a broken line indicate the temperature variations in the power supply unit 40 and the lamp driving unit 45, respectively. A bar graph indicates a driving voltage of the fan F4. Further, since the driving power of the discharge lamp 1 is in proportional to the luminance and the driving voltage of the fan F4 is in proportional to the air volume, it is possible to obtain and use the driving power of the discharge lamp 1 as the luminance and the driving voltage of the fan F4 as the air volume.

When the theater mode is selected and the luminance is decreased, since the temperature at the lamp driving unit 45 becomes higher than the temperature at the power supply unit 40, the fan F4 rotates with a driving voltage (7.5 V) that is determined on the basis of an air volume necessary for the cooling air W2 of the lamp driving unit 45 having the high temperature. Meanwhile, when the dynamic mode is selected and the luminance is increased, since the temperature at the power supply unit 40 becomes higher than the temperature at the lamp driving unit 45, the fan F4 rotates with a driving voltage (9 V) that is determined on the basis of an air volume necessary for the cooling air W1 of the power supply unit 40 having the high temperature.

Further, since the fan F4 is provided near the outer mounting surface of the projector 200 to efficiently intake the air from the outside, the fan is disposed with a dust-proof filter (not shown) therebetween, as compared with the fans F2 and F3 disposed in the projector, but operation sounds may easily leak to the outside.

Further, the temperature characteristics of the lamp driving unit 45 are in inverse proportion to the driving power of the discharge lamp 1. The reason results from the characteristics of the discharge lamp 1. Specifically, according to the characteristics of the discharge lamp 1, even if the driving voltage is decreased to suppress a light amount of the discharge lamp 1, a predetermined amount of power including a loss power is necessary for maintaining a turned-on state of the discharge lamp 1, that is, a discharge state of the discharge lamp 1. For this reason, even when the driving voltage is decreased, a load of the lamp driving unit 45 is rarely decreased. Further, the fact that the luminance is decreased while the air volume necessary for cooling is ensured, and thus the driving voltage of the fan F4 is decreased and the air volume of the cooling air W2 is decreased also becomes one factor of the reason.

As such, in the projector 200 according to the related art, the power supply unit 40 and the lamp driving unit 45 each having a different temperature characteristic are cooled down with the driving voltage based on the temperature of the side having the high temperature between the power supply unit 40 and the lamp driving unit 45, which increases noises and deteriorates energy utilization efficiency.

SUMMARY

An advantage of some aspects of the invention is that it provides a projector capable of preventing operation sounds from being loud and cooling down a plurality of heat emission portions with high energy utilization efficiency.

According to an aspect of the invention, a projector includes a light source unit that emits light, a lamp driving unit that supplies a driving power to the light source unit, a power supply unit that supplies a power to at least the lamp driving unit, a fan that circulates cooling air to the lamp driving unit and the power supply unit, a distribution unit that distributes air volumes of the cooling air by the fan to the lamp driving unit and the power supply unit, and changes the air volumes of the cooling air distributed to the lamp driving unit and the power supply unit, and a distribution control unit that performs driving control on the distribution unit so as to change the air volumes of the cooling air distributed to the lamp driving unit and the power supply unit in accordance with the driving power supplied to the light source unit.

As described above (see FIG. 9), the heat emission characteristic of the power supply unit shows a characteristic that is substantially in proportion to the driving power of the light source unit, and the temperature characteristic of the lamp driving unit shows a characteristic that is substantially in inverse proportion to the driving power of the light source unit. For this reason, when the driving power of the light source unit is small, if the air volume distributed to the lamp driving unit can be increased, the revolution number of the fan can be decreased. Similarly, when the driving power of the light source unit is large, the revolution number of the fan can be decreased by increasing the air volume distributed to the power supply unit.

According to this structure, the distribution control unit performs driving control on the distribution unit according to the driving power supplied to the light source unit, and changes the air volume of the cooling air that is distributed to each of the lamp driving unit and the power supply unit, which optimally distributes the total air volume of the cooling air by the fan to each of the power supply unit and the lamp driving unit according to the temperature characteristics of the power supply unit and the lamp driving unit.

As a result, since the revolution number of the fan is decreased, the noise level can be lowered and the power consumption can be reduced.

Accordingly, it is possible to provide a projector that is capable of preventing operation sounds from being loud and cooling down a plurality of heat emission portions with high energy utilization efficiency.

Preferably, the distribution control unit performs driving control on the distribution unit such that the air volume of the cooling air distributed to the power supply unit is increased when the driving power is increased.

According to this structure, when the driving power of the light source unit is increased, the distribution control unit performs driving control on the distribution unit so as to increase the air volume of the cooling air distributed to the power supply unit. Specifically, when the driving power of the light source unit is decreased, the distribution control unit performs driving control on the distribution unit so as to increase the air volume distributed to the lamp driving unit. That is, the distribution control unit determines the temperature states in the lamp driving unit and the power supply unit from the amount of the driving power of the light source unit correlated with the temperature states in the lamp driving unit and the power supply unit, and increases the air volumes of the cooling air with respect to the portions whose temperatures are increased according to each driving power.

As a result, even when the revolution number of the fan is decreased, it is possible to ensure the necessary cooling capability by effectively using the total air volume. Further, since the rotation number of the fan can be decreased, the noise level can be lowered and the power consumption can be reduced.

Accordingly, it is possible to provide a projector that is capable of preventing operation sounds from being loud and cooling down a plurality of heat emission portions with high energy utilization efficiency.

Preferably, the lamp driving unit and the power supply unit are disposed to be adjacent to each other, the fan is disposed to face the lamp driving unit and the power supply unit, and the distribution unit is a louver that has a plurality of louver boards and is disposed between the lamp driving unit and the power supply unit and the fan, and changes directions of the plurality of louver boards so as to change the air volumes of the cooling air.

According to this structure, since the distribution unit is a louver that has a plurality of louver boards, when directions of the plurality of louver boards are changed, it is possible to change the air volume of the cooling air that is distributed to each of the lamp driving unit and the power supply unit.

Accordingly, it is possible to provide a simplified projector that is capable of cooling down a plurality of heat emission portions with high energy utilization efficiency.

Preferably, the lamp driving unit and the power supply unit are disposed to be adjacent to each other, the fan is disposed to face the lamp driving unit and the power supply unit, the distribution unit is a rotary solenoid that changes a posture of the fan, and when the rotary solenoid is driven, the air volumes of the cooling air are changed.

According to this structure, since the distribution unit is a rotary solenoid, when the rotary solenoid is driven, it is possible to change the air volume of the cooling air that is distributed to each of the lamp driving unit and the power supply unit.

Accordingly, it is possible to provide a simplified projector that is capable of cooling down a plurality of heat emission portions with high energy utilization efficiency.

Preferably, the lamp driving unit and the power supply unit are disposed to be adjacent to each other, the fan is disposed to face the lamp driving unit and the power supply unit, the distribution unit is a linear actuator that moves a location of the fan along a surface facing the lamp driving unit and the power supply unit, and when the linear actuator driven, the air volumes of the cooling air are changed.

According to this structure, since the distribution unit is the linear actuator, when the linear actuator is driven, it is possible to change the air volume of the cooling air that is distributed to each of the lamp driving unit and the power supply unit.

Accordingly, it is possible to provide a simplified projector that is capable of cooling down a plurality of heat emission portions with high energy utilization efficiency.

Preferably, the lamp driving unit and the power supply unit are disposed to be adjacent to each other, the fan is disposed to face the lamp driving unit and the power supply unit, the distribution unit is a partition plate that is disposed between the lamp driving unit and the power supply unit and the fan, and moves along a surface facing the lamp driving unit and the power supply unit to change a size of an airflow orifice of the fan, and when the partition plate moves, the air volumes of the cooling air are changed.

According to this structure, since the distribution unit is the partition plate, when the partition plate moves, it is possible to change the air volume of the cooling air that is distributed to each of the lamp driving unit and the power supply unit.

For example, in regards to the location of the partition plate, when the portion of the airflow orifice of the fan facing the lamp driving unit is larger than the portion of the airflow orifice of the fan facing the power supply unit, a portion of the cooling air distributed to the power supply unit is distributed to the lamp driving unit. As a result, it is possible to increase the air volume of the cooling air that is distributed to the lamp driving unit. Meanwhile, in regards to the location of the partition plate, when the portion of the airflow orifice of the fan facing the power supply unit is larger than the portion of the airflow orifice of the fan facing the lamp driving unit, a portion of the cooling air distributed to the lamp driving unit is distributed to the power supply unit. As a result, it is possible to increase the air volume of the cooling air that is distributed to the power supply unit.

Accordingly, in is possible to provide a simplified projector that is capable of cooling down a plurality of heat emission portions with high energy utilization efficiency.

Preferably, the projector according to the aspect of the invention further includes a fan that cools down the light source unit, a fan that cools down a light modulating unit that modulates light emitted from the light source unit into modulation light displaying an image, and a fan that exhausts air, which is blown by the plurality of fans and absorbs heat emitted from the respective units, to the outside.

As described above, the main heat emission portions in the projector include the light source unit, the light modulating unit, the power supply unit, and the lamp driving unit.

According to this structure, the projector includes at least four fans. That is, the projector includes a fan that blows cooling air to the lamp driving unit and the power supply unit, a fan, that blows a cooling air to the main heat emission portions, such as the light source unit and the light modulating unit, and a fan that exhausts the air having absorbed the heat emitted from the respective units to the outside.

Therefore, different from the projector disclosed in JP-A-2000-221599 in which the seven cooling fans are required, in the projector according to the aspect of the invention, it is possible to efficiently cool down the entire projector including the main heat emission portions by means of the four fans. Further, the fan that cools down the power supply unit and the lamp driving unit can optimize the air volumes distributed to the power supply unit and the lamp driving unit by means of the distribution unit, which suppresses the revolution number of the fans and reduces the noises.

Accordingly, it is possible to provide a projector that is capable of preventing operation sounds from being loud and cooling down a plurality of heat emission portions with high energy utilization efficiency.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the preferred embodiments of the invention will be described with reference to the accompanying drawings.

First Embodiment

Schematic Structure of Projector

Figure 1:
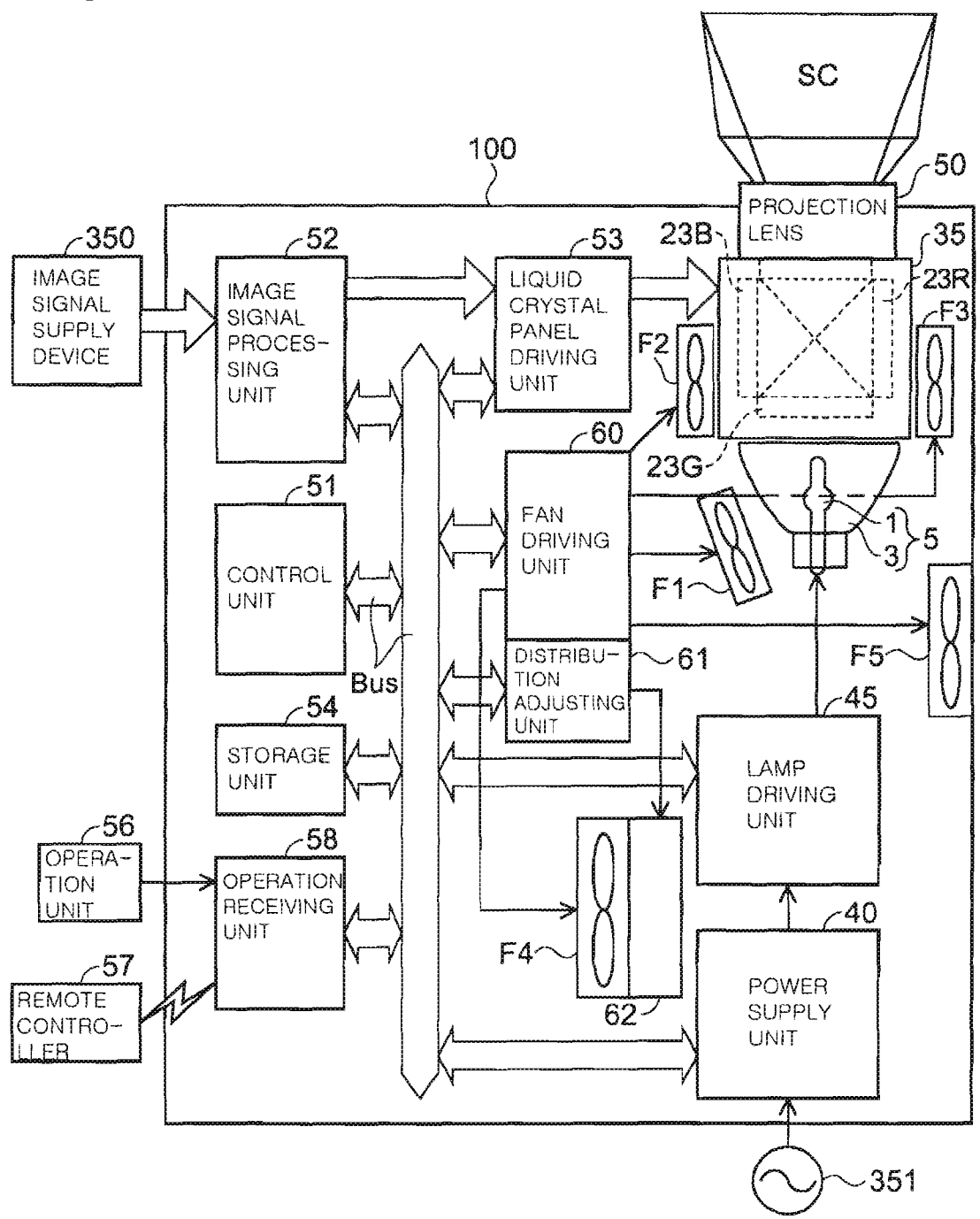
FIG. 1 is a diagram illustrating a schematic structure of a projector according to a first embodiment of the invention.

FIG. 1 is a diagram illustrating a schematic structure of a projector according to a first embodiment of the invention. A schematic structure of a projector 100 will be described with reference to FIG. 1. For the purpose of comparison between the related art and the preferred embodiments of the invention, the same constituent elements as those in the projector 200 according to the related art are denoted by the same reference numerals.

The projector 100 is a so-called "liquid crystal three-plate-type projector" having a structure in which it splits light emitted from the a light source unit 5 into three primary color light components including a red light component, a green light component, and a blue light component, modulates the separated color light components by liquid crystal light valves 23R, 23G, and 23B for the respective color light components, which serve as light modulating elements for every color light component, according to image signals, and projects synthesized full-color modulating light onto a screen SC to be enlarged by a projection lens 50. Further, the liquid crystal light valves 23R, 23G, and 23B are provided for red, green, and blue light components, respectively, and are included in a structure of an optical unit 35.

The projector 100 includes a light source unit 5, an optical unit 35, a projection lens 50, a control unit 51 an image signal processing unit 52, a liquid crystal panel driving unit 53, a storage unit 54, an operation unit 56, a remote controller 57, an operation receiving unit 58, a power supply unit 40, a lamp driving unit 45, fans F1 to F5, a fan driving unit 60, a distribution adjusting unit 61, and a louver 62 that functions as a distribution unit.

The light source unit 5 includes a discharge lamp 1, such as a high pressure discharge lamp or a metal halide lamp, a reflector 3 that collects light emitted from the discharge lamp 1 and emits the collected light to the side of the optical unit, and the like. Further, since the light source unit 5 includes the discharge lamp 1 that emits heat when turned on, the light source unit 5 becomes a maximal heat emitting unit in the projector 100.

The optical unit 35 includes an integrator illumination optical system that converts light emitted from the light source unit 5 into light whose luminance distribution is uniformed, a separation optical system that splits the light whose illumination distribution is uniformed into color light components of three primary colors including red, green, and blue and supplies the separated light components to the liquid crystal light valves 23R, 23G, and 23B for the respective color light components, and a synthesis optical system that synthesizes the color light components modulated by the liquid crystal light valves for each color light component according to image signals and generates full-color modulation light. Further, the optical unit 35 will be described in detail below. The light modulating unit 30 (see FIG. 2) that includes the liquid crystal light valves 23R, 23G, and 23B in the optical unit 35 becomes a heat emission portion. The reason why the light modulating unit 30 becomes a heat emission portion is because the corresponding portion is irradiated with light from the light source unit 5, and thus light that is not modulated becomes heat.

The projection lens 50, includes a zoom lens. The projection lens 50 enlarges the full-color modulation light emitted from the optical unit 35 and projects a full-color image onto a screen SC.

The control unit 51 is a CPU (Central Processing Unit), and exchanges signals together with respective units including the fan driving unit 60 and the distribution adjusting unit 61 through a bus line Bus and controls the projector 100.

The image signal processing unit 52 includes an image converter that converts an image signal input from an external image signal supply device 350, such as a personal computer, into a digital signal from an analog signal, a scaler, and a frame memory (all of them are not shown in the drawings).

The image signal processing unit 52 performs an A/D conversion process on an analog image signal, such as an input analog RGB signal or a component signal, by using the image converter, and then performs an image process, such as scaling, on the converted signal.

The image signal processing unit 52 writes image data represented by an image signal in a frame memory for each of the light components of colors including R, G, and B with resolution of the corresponding image signal, converts the resolution into resolution with which the image can be displayed by the liquid crystal light valves 23R, 23G, and 23B, performs a read operation, and generates image signals that are suitable for the corresponding liquid crystal light valves. Further, a trapezoidal correction process, which approximates a shape of an effective image projected onto the screen SC to a rectangular shape, is also performed according to the scaling.

The liquid crystal panel driving unit 53 is a liquid crystal panel driver. The liquid crystal, panel driving unit 53 supplies an image signal on which an image process is performed and a driving voltage to the liquid crystal light valves 23R, 23G, and 23B, and drives the liquid crystal light valves.

The storage unit 54 is composed of a nonvolatile memory, such as, for example, a mask ROM, a flash memory, or a FeRAM. The storage unit 54 stores various programs, such as driving programs that define orders and contents for driving the projector 100, which control an operation of the projector 100, and accompanied data.

The programs include a light control program that adjusts a driving power supplied to the discharge lamp 1 according to a selected color mode, a fan control program that adjusts a driving voltage of the fan F4 and a direction of the louver 62 in synchronization within the light control program. Further, the accompanied data includes a driving power supplied to the discharge lamp 1 defined for each color mode, a driving voltage of each fan, driving data of the louver 62, parameters, and the like.

The operation unit 56 is provided on a top surface of a main body of the projector 100, and includes a plurality of operation buttons (not shown) for operating the projector 100. The plurality of operation buttons includes a "power supply button" that starts and shuts down the projector 100, a "menu button" that displays various operation menus, a "directional key" in which selection can be made in all directions in order to select a desired operation from the operation menus, a "decision button" that executes the selected operation, and the like.

Further, the operational menus include a "color mode set" item for selecting a plurality of color modes that are set according to projection environments. The color modes include a dynamic mode which is suitable for viewing an image in a bright room or a theater mode in which a user can enjoy an image of great depth in a dark illumination environment.

When the theater mode is selected, a first driving power at the low luminance is applied to the discharge lamp 1. Further, when the dynamic mode is selected, a second driving power at the high luminance, which is larger than the first driving power at the low luminance, is applied to the discharge lamp 1. In the projector 100, as initial set of the color mode, a high luminance dynamic mode using the second driving power is set.

The remote controller 57 is a remote controller that performs remote control on the projector 100, and includes a plurality of operation buttons that operate the projector 100, similar to the operation unit 56.

When the operation unit 56 or the remote controller 57 is operated, the operation receiving unit 58 receives the corresponding operation and transmits operation signals becoming triggers of various operations to the control unit 51.

The power supply unit 40 is supplied with an alternating current power from an external power supply 351 from an inlet, performs transforming, rectifying, and smoothing processes on the alternating current power by an AC/DC conversion unit (not shown) incorporated therein, and supplies the stabilized power to the respective units of the projector 100 including the lamp driving unit 45.

Further, the power supply unit 40 is a heat emission portion. The reason why the power supply unit 40 becomes the heat emission portion is because a power that is not converted into an effective output voltage becomes heat in terms of the power conversion efficiency.

The lamp driving unit 45 includes an igniter circuit (not shown) that generates a high voltage to turn on the discharge lamp 1 and forms a discharge path and a ballast circuit (not shown) that maintains a turned-on state stabilized after being turned on. The driving powers that are supplied from the lamp driving unit 45 to the discharge lamp 1 include a first driving power at the time of low luminance and a second driving power at the high luminance that is larger than the first driving power at the low luminance. In the case of the projector 100, the first driving power is set to a power of about 135 W and the second driving power is set to a power of about 170 W.

Further, similar to the power supply unit 40, the lamp driving unit 45 also becomes a heat emission portion. Further, because of characteristics of the discharge lamp 1, even when the discharge lamp 1 is light-controlled to decrease luminescence, it is required to ensure a predetermined amount of power including a loss power to maintain a discharge state. Therefore, an amount of emission heat rarely varies.

As described above, the main heat emission portions in the projector 100 become the light source unit 5, the light modulating unit 30 (FIG. 2), the light source unit 40, and the lamp driving unit 45. In the projector 100, since the power supply unit 40 and the lamp driving unit 45 are disposed to be adjacent to each other, if the power supply unit 40 and the lamp driving unit 45 are assumed as one portion, exclusive cooling fans F1 to F4 are provided for the respective units.

The fan F1 is a Sirocco fan that blows a cooling air to the light source unit 5. The fans F2 and F3 are Sirocco fans that blow cooling airs to the light modulating unit 30 (see FIG. 2) of the optical unit 35. The number of the cooling fans that are provided in the light modulating unit 30 is not limited to two. For example, one fan may be provided in the light modulating unit 30; or three fans may be provided so as to correspond to the respective liquid crystal light valves 23R, 23G, and 23B.

The fan F4 is disposed to face the power supply unit 40 and the lamp driving unit 45, and is an axial flow fan that blows cooling airs to the power supply unit 40 and the lamp driving unit 45.

The fan F5 is an axial flow fan that exhausts air having heat emitted from each heat emission portion to the outside of the projector. Further, the specific arrangement of the fan F1 to F5 will be described in detail below.

The fan driving unit 60 is a driving circuit that drives rotation of the fans F1 to F5 according to the control signals supplied from the control unit 51. The driving circuit includes a five-channel D/A converter to which an output buffer operational amplifier is attached, and five four-terminal regulators (all of them are not shown in the drawings) that generate a driving voltage according to an adjusting voltage output for each channel of the D/A converter. In accordance with adjustment data that defines a driving voltage for each of the fans F1 to F5 input from the control unit 51, the D/A converter outputs each corresponding adjusting voltage from each channel to each four-terminal regulator. Further, the structure of the driving circuit is not limited to the above-described structure. For example, in the driving circuit, instead of the regulator, a DC/DC converter may be used.

The distribution adjusting unit 61 is a driving circuit of a solenoid that includes a switching element, such as a power transistor, and drives a rotary solenoid 65 to be described below in accordance with a driving pulse from the control unit 51.

In this embodiment, the distribution control unit includes a control unit 51 and a distribution adjusting unit 61.

Figure 2:
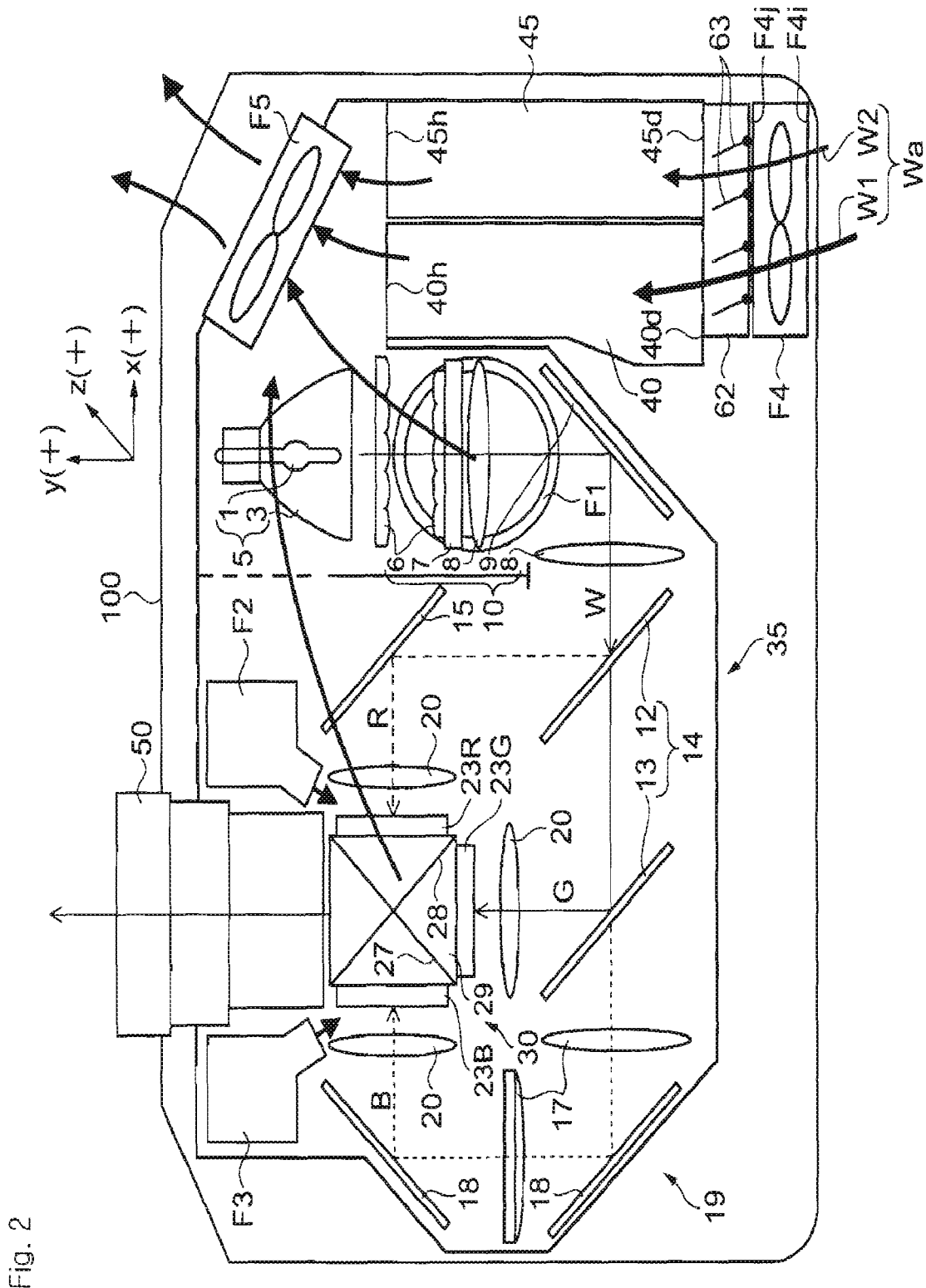
FIG. 2 is a schematic plan view illustrating an optical system and a cooling structure of a projector as main components.

In this invention, the louver 62 that functions as the distribution unit according to the embodiment of the invention is provided on an air blowing surface of the fan F4, and is provided with a rotary solenoid 65 (see FIGS. 3A and 3B) that changes directions of a plurality of louver boards 63 (see FIG. 2).

Outline of Optical Unit

FIG. 2 is a schematic plan view illustrating an optical system and a cooling structure in a projector according to an embodiment of the invention as main components. Referring to FIG. 2, an optical system that includes the optical unit 35 of the projector 100 will be described.

The optical unit 35 includes a uniform illumination system 10, a separation optical system 14, a relay optical system 19, a light modulating unit 30, and the like.

The uniform illumination system 10 includes two fly-eye lenses 6, a polarization conversion element 7, two capacitor lenses 8, a reflection mirror 9, and the like.

The fly-eye lens 6 has a structure in which small lenses each having an approximately rectangular outline when viewed from the direction of the light source unit 5 are disposed in a matrix. In this embodiment, the two fly-eye lenses form a pair. Each of the small lenses forming pairs splits a light beam emitted from the light source unit 5 into partial light beams, and emits the partial light beams in an optical axial direction. A plurality of light source images that are emitted from the respective small lenses pass through the two capacitor lenses 8, and form images on the surfaces of the liquid crystal light valves 23R, 23G, and 23B. As a result, the luminance distribution on the surfaces of the liquid crystal light valves 23R, 23G, and 23B becomes uniform.

The polarization conversion element 7 includes a PBS (Polarization Beam Splitter) array and a ½ wavelength plate, and converts random polarized light into specific linear polarized light. Since the specific linear polarized light is polarized to be incident on an incident polarization plate (not shown) that is provided on an incident surface of each liquid crystal light valve, it is possible to effectively use light that may be wastefully consumed as heat because the polarized light cannot transmit the incident polarization plate when there is not the polarization conversion element 7.

The light that is emitted from the light source unit 5 passes through the two fly-eye lenses 6, the polarization conversion element 7, and the capacitor lenses 8, is reflected on the reflection mirror 9, and is emitted to the side of the separation optical system 14 through the capacitor lenses 8. Furthers the uniform illumination system 10 may be disposed close to the light source unit 5 to be a heat source. Since the uniform illumination system 10 emits a predetermined amount of heat, it is preferable that the uniform illumination system 10 be cooled down together with the light source unit 5.

The separation optical system 14 includes a dichroic mirror 12 and a dichroic mirror 13.

The dichroic mirror 12 is an optical element that is provided with a dichroic film having a property that reflects an R light component on a glass plate or the like and transmits B and G light components. The dichroic mirror 12 reflects the R light component on the reflection mirror 15 and transmits the B light component and the G light component. The R light component that is reflected on the reflection mirror 15 is collimated by a collimation lens 20 and is incident on the liquid crystal light valve 23R. The B and G light components that have transmitted the dichroic mirror 12 are incident on the dichroic mirror 13.

The dichroic mirror 13 is an optical element that is provided with a dichroic film having a property that reflects the G light component and transmits the B light component. The dichroic mirror 13 reflects the G light component on the side of the liquid crystal light valve 23G and transmits the B light component. The G light component that is reflected on the dichroic mirror 13 is collimated by the collimation lens 20 and is incident on the liquid crystal light valve 23G. The B light component that has transmitted the dichroic mirror 13 is incident on the relay optical system 19.

The relay optical system 19 includes two relay lenses 17 and two reflection mirrors 18.

The B light component that has transmitted the dichroic mirror 13 is reflected on the reflection mirror 18 through the relay lens 17, is further reflected on the reflection mirror 18 through another relay lens 17, is collimated by the collimation lens 20, and is incident on the liquid crystal light valve 23B. The two relay lenses 17 are provided to prevent attenuation of the B light component among the three color light components that have been separated, which passes through the longest optical path.

The light modulating unit 30 includes the liquid crystal light valves 23R, 23G, and 23B for the respective color light components, and a cross dichroic prism 29., The liquid crystal light valves 23R, 23G, and 23B are provided to face the three surfaces of the cross dichroic prism 29 forming an approximate cubic shape. An incident polarizing plate (not shown) is provided on a light incident surface in each liquid crystal light valve, and an emission polarizing plate (not shown) is provided on a light emission surface facing the cross dichroic prism 29. Further, the emission polarization plate may have a structure in which it is attached to each surface of the cross dichroic prism 29 in advance.

Although a polarization direction is uniform by the polarization conversion element 7, the incident polarization plate on which the light is incident in an approximately vertical direction generates heat by the light that cannot be transmitted. Similarly, since the heat is generated in the liquid crystal light valves 23R, 23G, and 23B or the emission polarizing plate, the light modulating unit 30 that includes the cross dichroic prism 29 that closely adheres to the emission polarization plate becomes a heat emission portion.

Each of the liquid crystal light valves 23R, 23G, and 23B is an active-matrix-type liquid crystal display element that includes a plurality of pixels according to resolution.

Each of the color light components that are incident on the liquid crystal light valves 23R, 23G, and 23B is modulated into each color modulation light component including an optical image for each color light component, and is emitted to the inside of each cross dichroic prism 29.

The cross dichroic prism 29 that functions as a synthesis optical system has a structure in which four right-angle prisms are attached to one another. In the cross dichroic prism 29, a dichroic film 27 that is a dielectric multilayered film reflecting the B light component and a dichroic film 28 that is a dielectric multilayered film reflecting the R light component are provided in an X shape.

The cross dichroic prism 29 transmits the green modulation light from the liquid crystal light valve 23G, reflects the red modulation light from the liquid crystal light valve 23R and the blue modulation light from the liquid crystal light valve 23B to overlap the red modulation light and the blue modulation light and the green modulation light, and emits modulation light including a full-color image obtained by synthesizing the modulation light of the three primary colors to the projection lens 50.

The modulation light that is emitted from the cross dichroic prism 29 as a full-color image is projected on the screen or the like to be enlarged, by means of the projection lens 50 that is a wide-angle zoom lens obtained by combining a plurality of Gauss-typed lenses.

Outline of Cooling Structure

Hereinafter, a cooling structure of the projector 100 will be described with reference to FIG. 2.

Further, arrows shown by solid lines in FIG. 2 indicate flow passages of the cooling airs.

The cooling fans F1 to F4 are respectively provided for main heat emission portions in the projector 100. In this case, the main heat emission portions include the light source unit 5, the light modulating unit 30, the power supply unit 40, and the lamp driving unit 45.

The fan F1 is a Sirocco fan that is provided at a lower side (plus z-axis direction) of the uniform illumination system 10. The fan F1 sucks air from the intake port (not shown) provided on a bottom surface of the projector 100 through the dustproof filter (not shown), and blows air such that the cooling air uniformly spreads even in the vicinity of the fly-eye lens 6 and the polarization conversion element 7 on the basis of the light source unit 5 from the lower side.

The fans F2 and F3 are respectively disposed on the side surfaces of the projection lens 50 in a state where air blowing ports thereof are toward the light modulating unit 30 side. The fans F2 and F3 suck the air from the intake port of the bottom surface in common to the fan F1, and blow air such that the cooling air uniformly spreads over the entire light modulating unit 30 from the lower side.

The fans F1 to F3 effectively use a space of the projector 100 in a thicknesswise direction (z-axis direction) and cool down the respective heat emission portions. The air heated by absorbing the heat from the respective heat emission portions is guided to the exhaust fan F5 so as to be exhausted to the outside of the projector 100.

The fan F4 is an axial flow fan, and is disposed such that the air blowing surface F4j faces the intake surfaces 40d and 45d of the power supply unit 40 and the lamp driving unit 45 to be disposed adjacent to each other.

Since each of the power supply unit 40 and the lamp driving unit 45 comprises from a circuit board (not shown) including a high voltage circuit, such as a boosting chopper circuit, as a main part, each of the power supply unit 40 and the lamp driving unit 45 includes a box-like individual body that is made of a metal material and has a shielding property, such that an electromagnetic noise due to the high voltage does not leak to the outside. The intake surfaces 40d and 45d and the air blowing surfaces 40h and 45h in the corresponding individual bodies are provided in a metal mesh shape or a mesh shape by a plurality of slits, and can smoothly introduce and exhaust the cooling air by the fan F4.

The intake surface F4i of the fan F4 faces the intake port (not shown) that is provided on a rear surface (minus y-axis direction) of the projector 100. Further, in the intake port, the dust-proof filter (not shown) is provided.

The louver 62 according to the embodiment of the invention is provided between the fan F4 and the intake surfaces 40d and 45d of the power supply unit 40 and the lamp driving unit 45.

The louver 62 is a distribution unit, and has a plurality of louver boards 63 that are provided on the air blowing surface F4j of the fan F4.

The cooling air W2 which the fan F4 blows is divided into a cooling air W1 of the power supply unit 40 and a cooling air W2 of the lamp driving unit 45 according to directions of the plurality of louver boards 63 and distributed to the corresponding part respectively.

The cooling airs W1 and W2 absorb the heat from the power supply unit 40 and the lamp driving unit 45, are guided to the exhaust fan F5, and are exhausted to the outside of the projector 100.

Aspect of Distribution Unit

Figure 3A:
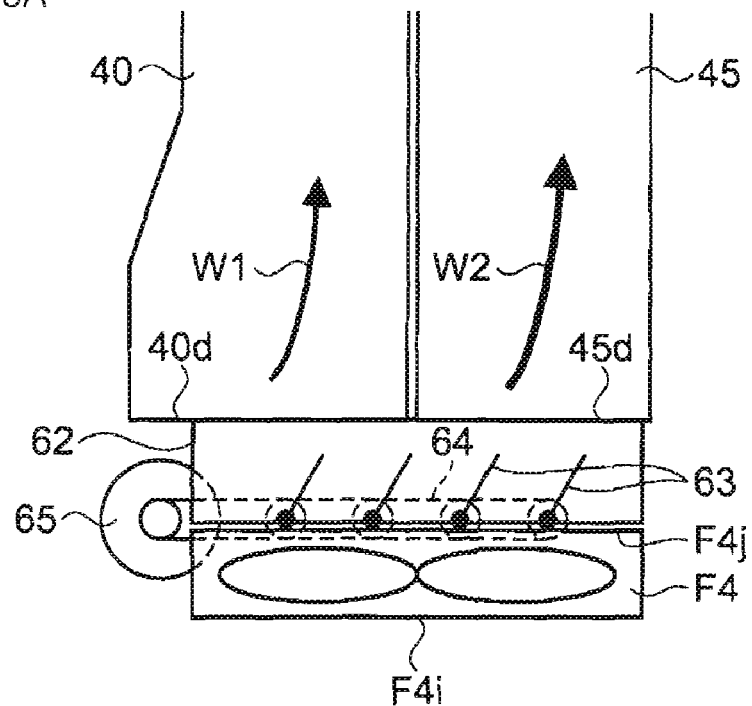
FIG. 3A is a diagram illustrating an aspect of a distributing unit when low luminance is set.
Figure 3B:
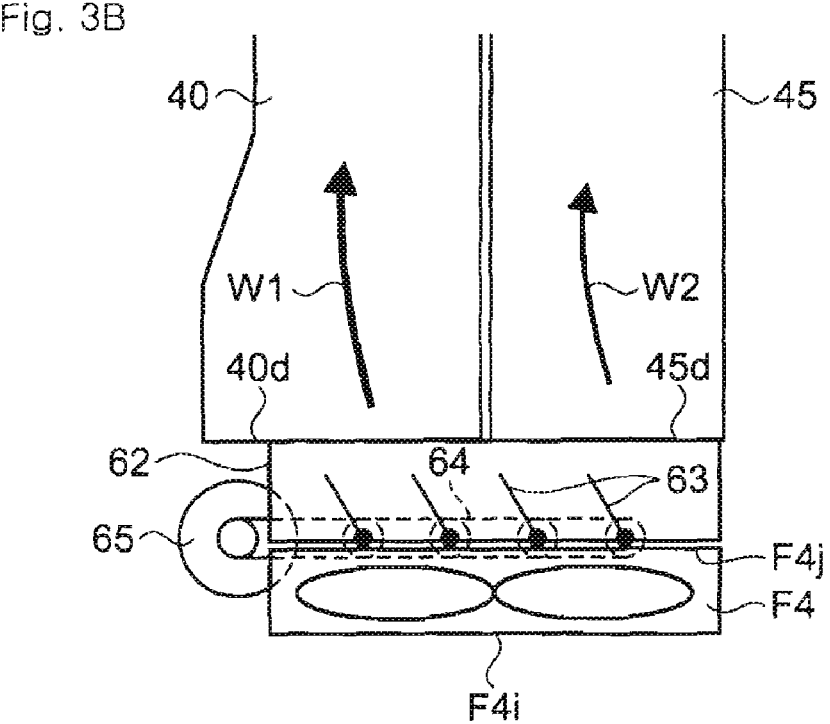
FIG. 3B is a diagram illustrating an aspect of a distributing unit when high luminance is set.

FIG. 3A is a diagram that illustrates an aspect of a distribution unit under a setting for low luminance. FIG. 3B is a diagram that illustrates an aspect of a distribution unit under a setting for high luminance.

Hereinafter, the aspects of the louver 62 according to the embodiment of the invention will be described with reference to FIGS. 3A and 3B, and with reference to FIG. 1.

When the theater mode selection operation is performed by using the remote controller 57, a light control program in the storage unit 54 is executed. A first driving power is supplied from the lamp driving unit 45 to the discharge lamp 1, which enters a low luminance state. Further, a fan control program is executed in synchronization with the light control program, the driving voltage of the fan F4 is reduced by the fan driving unit 60, and the driving pulse is transmitted to the distribution adjusting unit 61.

The distribution adjusting unit 61 drives the rotary solenoid 65 of the louver 62 according to the driving pulse. If the rotary solenoid 65 is driven, the driving belt 64 connected to the rotary solenoid and the plurality of louver boards 63 connected to the driving belt are interlocked with each other, and the plurality of louver boards 63 are oriented in a direction determined at the side of the lamp driving unit 45.

This state is shown in FIG. 3A. In this state, since the plurality of louver boards 63 are toward the side of the lamp driving unit 45, the air volume in the cooling air W2 of the lamp driving unit 45 becomes larger than the air volume in the cooling air W1 of the power supply unit 40.

Similarly, FIG. 3B shows an aspect of the louver 62 in a case where the dynamic mode is selected.

When the dynamic mode is selected and the discharge lamp 1 enters the high luminance state by application of the second driving power from the lamp driving unit 45, the driving voltage of the fan F4 is increased, and the plurality of louver boards 63 of the louver 62 are oriented in a direction determined at the side of the power supply unit 40. Further, the determined direction is defined by driving data and parameters in accompanied data stored in the storage unit 54, and this information is previously set in a design stage on the basis of the temperature characteristics of the power supply unit 40 and the lamp driving unit 45.

In this state, since the plurality of louver boards 63 are toward the side of the power supply unit 40, the air volume in the cooling air W1 of the power supply unit 40 becomes larger than the air volume in the cooling air W2 of the lamp driving unit 45.

As such, when the driving power of the light source unit 5 is increased, the distribution control unit performs driving control on the distribution unit so as to increase the air volume of the cooling air distributed to the power supply unit 40. That is, the distribution control unit 61 increases the air volume of the cooling air to the portions whose temperature are increased according to each driving power amount.

Figure 4:
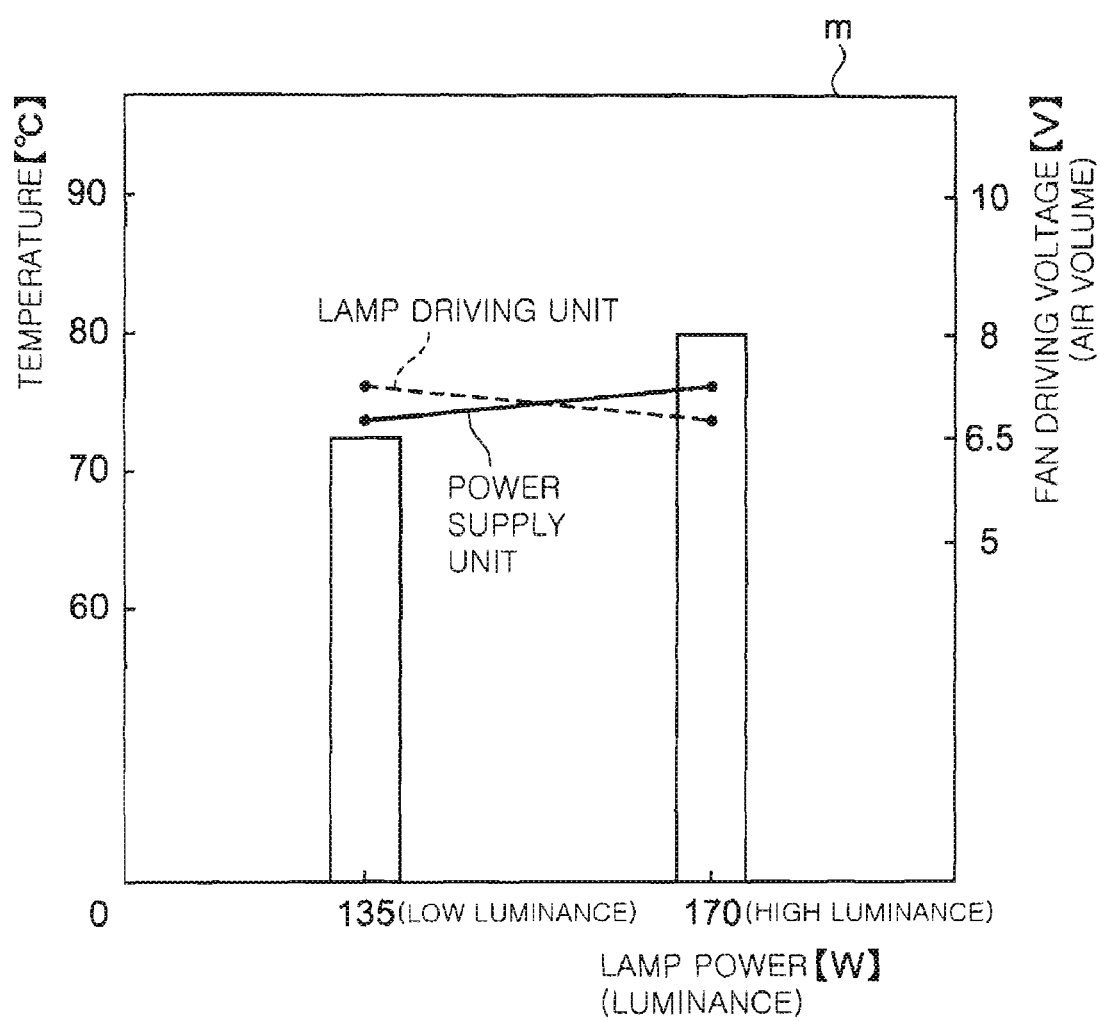
FIG. 4 is a graph illustrating temperature states of a power supply unit and a lamp driving unit according to a driving power (luminance) of a light source unit in a projector according to an embodiment of the invention.

FIG. 4 is a graph illustrating temperature states of a power supply unit and a lamp driving unit according to a driving power (luminance) of the light source unit in a projector according to an embodiment of the invention.

Figure 9:
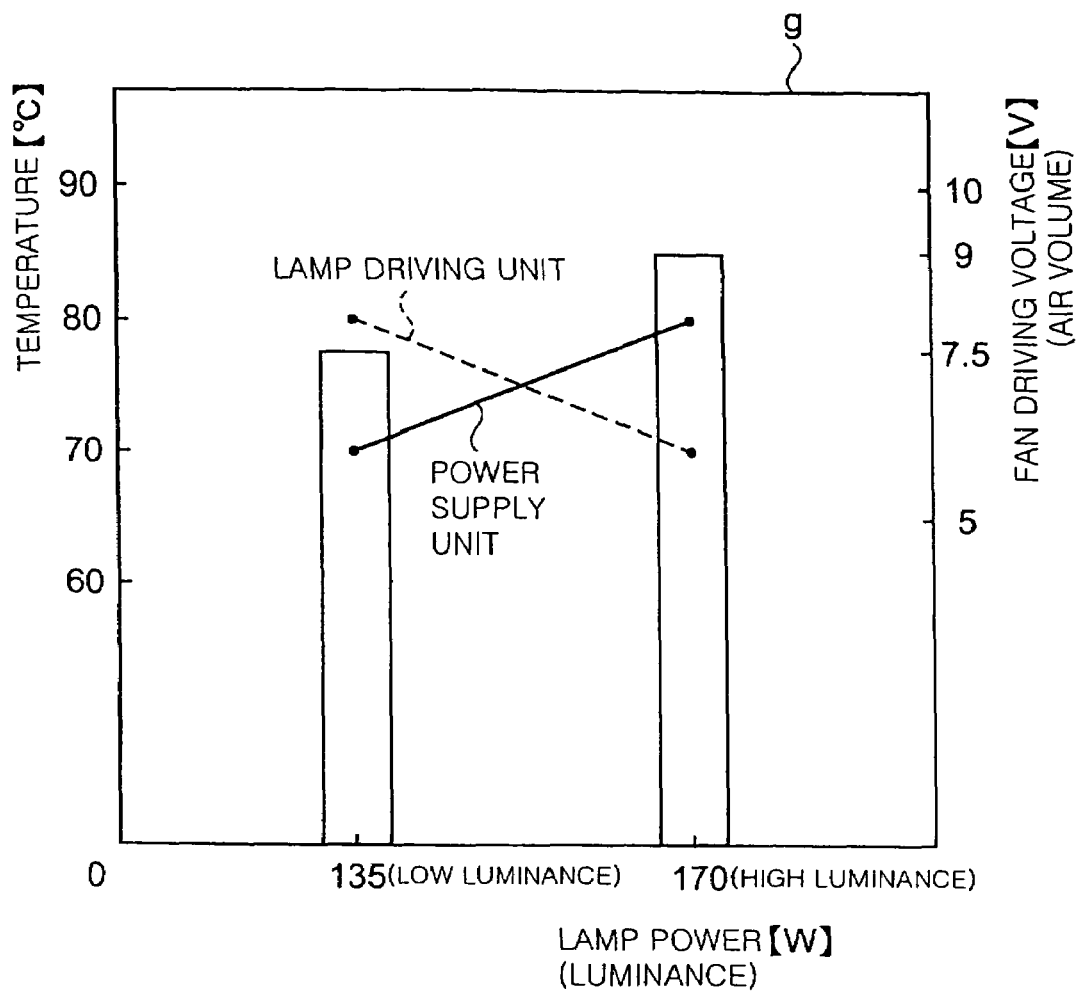
FIG. 9 is a graph illustrating temperature states of a power supply unit and a lamp driving unit according to a driving power (luminance) of a light source unit in a projector according to the related art.

A graph m is constructed by the same graduation axis, similar to the graph g of FIG. 9. In this case, the description is made while the graph m and the graph g are compared with each other.

When the theater mode is selected and the first driving power is applied to the light source unit 5 to decrease the luminance, since the ratio of the air volume of the cooling air W2 that is distributed to the lamp driving unit 45 by the louver 62 is increased, cooling efficiency of the lamp driving unit 45 is improved. As a result, as shown by the graph m, even when the driving voltage of the fan F4 is decreased, it is possible to surely cool dowel the lamp driving unit 45. Further, the graph m shows the temperature state of the lamp driving unit 45 in a state where the driving voltage of the fan F4 is decreased. Specifically, the driving voltage of the fan F4 is about 7.5 V in the graph g, while the driving voltage is about 6.5 V in the graph m.

Further, the temperature of the power supply unit 40 increases the ratio of the air volume of the cooling air W2 that is distributed to the lamp driving unit 45 by the louver 62 and decreases the driving voltage of the fan F4. As a result, since the air volume is decreased, the temperature of the power supply unit 40 is increased as compared with the temperature in the graph g in the excessively cooled state, but is in a range of a rated temperature. Accordingly, in the graph m, the temperature difference between the lamp driving unit 45 and the power supply unit 40 is decreased.

Similarly, when the dynamic mode is selected and the second driving power is applied to the light source unit 5 to increase the luminance, since the ratio of the air volume of the cooling air W1 that is distributed to the power supply unit 40 by the louver 62 is increased, cooling efficiency of the power supply unit 40 is improved. As a result, as shown by the graph m, even when the driving voltage of the fan F4 is decreased, it is possible to sufficiently cool down the power supply unit 40. Specifically, the driving voltage of the fan F4 is about 9 V in the graph g, while the driving voltage is about 8 V in the graph m.

Further, the temperature of the lamp driving unit 45 increases the ratio of the air volume of the cooling air W1 that is distributed to the power supply unit 40 by the louver 62 and decreases the driving voltage of the fan F4. As a result, since the air volume is decreased, the temperature of the lamp driving unit 45 is increased as compared with the temperature in the graph g in the excessively cooled state, but is in a range of a rated temperature. Accordingly, in the graph m, the temperature difference between the power supply unit 40 and the lamp driving unit 45 is decreased.

As such, a balance in air volume between the cooling air W1 of the power supply unit 40 and the cooling air W2 of the lamp driving unit 45 is optimized according to the temperature characteristics of the power supply unit 40 and the lamp driving unit 45, which decreases the driving voltage of the fan F4 in each of the low luminance and the high luminance.

Further, the description has been made of the case where the two stages of driving powers exist, but even when driving powers of a plurality of stages of three stages or more exist, the air volume can be distributed according to the temperature characteristics of the power supply unit 40 and the lamp driving unit 45 in the same manner as the above.

As described above, according to this embodiment, the following effects can be obtained.

First, the temperature characteristic of the power supply unit 40 shows a characteristic that is substantially in proportion to the driving power (luminance) of the discharge lamp 1, and the temperature characteristic of the lamp driving unit 45 shows a characteristic that is substantially in inverse proportion to the driving power (luminance) of the discharge lamp 1. For this reason, when the driving power of the discharge lamp 1 is small, if it is possible to increase the air volume of the cooling air distributed to the lamp driving unit 45, the revolution number of the fan F4 can be decreased. Similarly, when the driving power of the discharge lamp 1 is large, the revolution number of the fan F4 can be decreased by increasing the air volume of the cooling air distributed to the distribution unit 40.

The projector 100 changes directions of the plurality of louver boards 63 in the louver 62 according to the driving power (luminance) of the discharge lamp 1, and distributes the air volume of the cooling air Wa by the fan F4 to the cooling air W1 of the power supply unit 40 and the cooling air W2 of the lamp driving unit 45.

In addition, since the balance in air volume between the cooling air W1 of the power supply unit 40 and the cooling air W2 of the lamp driving unit 45 is optimized according to the temperature characteristics of the power supply unit 40 and the lamp driving unit 45, it is possible to suppress a total air volume of the cooling air Wa by the fan F4, which decreases the revolution number of the fan F4. Therefore, the noise level can be lowered and the driving power of the fan F4 can be decreased.

Specifically, in the graph m of FIG. 4, the driving voltage of the fan F4 in the case where the discharge lamp 1 is in a low luminance state is about 6.5 V, and becomes smaller than a driving voltage of about 7.5 V (see the graph g in FIG. 9) in the projector 200 according to the related art. Similarly, the driving voltage of the fan F4 in the case where the discharge lamp 1 is in a high luminance state is about 8 V, and becomes smaller than a driving voltage of about 9 V (see the graph g in FIG. 9) in the projector 200 according to the related art.

Accordingly, it is possible to provide the projector 100 that is capable of preventing the operation sounds from being loud and cooling down the plurality of heat emission portions with high energy utilization efficiency.

Second, when the first driving power is applied to the discharge lamp 1 and the luminance is decreased, the distribution adjusting unit 61 performs driving control on the rotary solenoid 65 so as to increase the air volume of the cooling air W2 distributed to the lamp driving unit 45, and when the second driving power is applied to the discharge lamp 1 and the luminance is increased, the distribution adjusting unit 61 performs driving control on the rotary solenoid 65 so as to increase the air volume of the cooling air W1 distributed to the power supply unit 40. That is, the distribution adjusting unit 61 increases the air volume of the cooling air to the portions whose temperatures are increased according to each driving power amount.

As a result, even when the revolution number of the fan F4 is decreased, it is possible to ensure the necessary cooling capability by effectively using the total air volume of the cooling air Wa by the fan F4. Further, since the revolution number of the fan F4 is decreased, the noise level can be lowered and the power consumption can be reduced.

Accordingly, it is possible to provide the projector 100 that is capable of preventing the operation sounds from being loud and cooling down the plurality of heat emission portions with high energy utilization efficiency.

Third, since the distribution unit is the louver 62 that has the plurality of louver boards 63, the distribution unit can change the directions of the plurality of louver boards 63 so as to change the air volume of the cooling air that is distributed to each of the lamp driving unit 45 and the power supply unit 40.

Accordingly, it is possible to provide the simplified projector 100 that is capable of cooling down the plurality of heat emission portions with high energy utilization efficiency.

Fourth, the projector 100 includes at least five fans. That is, the projector 100 includes the fans F1 to F4 that blow the cooling air to the main heat emission portions, such as the part including the lamp driving unit 45 and the power supply unit 40, the light source unit 5, and the light modulating unit 30, and the fan F5 that exhausts the air having absorbed the heat emitted from the respective units to the outside of the projector. Further, if the two fans F2 and F3 in the light modulating unit 30 are integrated with each other as one fan, the total four fans can be included.

Therefore, different from the projector disclosed in JP-A-2000-221599 in which the seven cooling fans are required, in the projector according to the embodiment of the invention, it is possible to efficiently cool down the entire projector 100 including the main heat emission portions by means of the five fans (or four fans). Further, the fan F4 that cools down the power supply unit 40 and the lamp driving unit 45 can optimize the air volume distributed to the power supply unit 40 and the lamp driving unit 45 by means of the louver 62, which suppresses the revolution number of the fans and reduces the noises.

Accordingly, it is possible to provide the projector 100 that is capable of preventing the operation sounds from being loud and cooling down the plurality of heat emission portions with high energy utilization efficiency.

Second Embodiment

Different Aspect of Distribution Unit

Figure 5A:
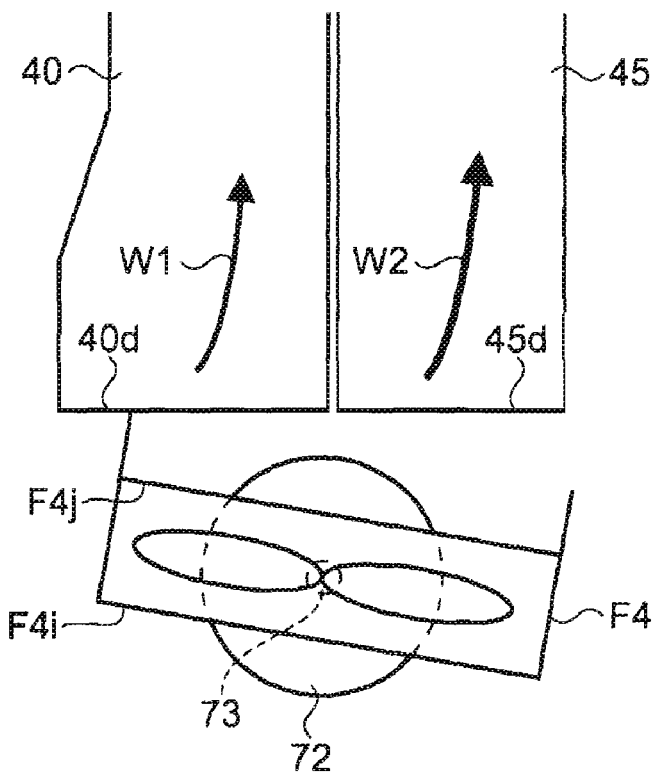
FIG. 5A is a diagram illustrating another aspect of a distributing unit when low luminance is set.
Figure 5B:
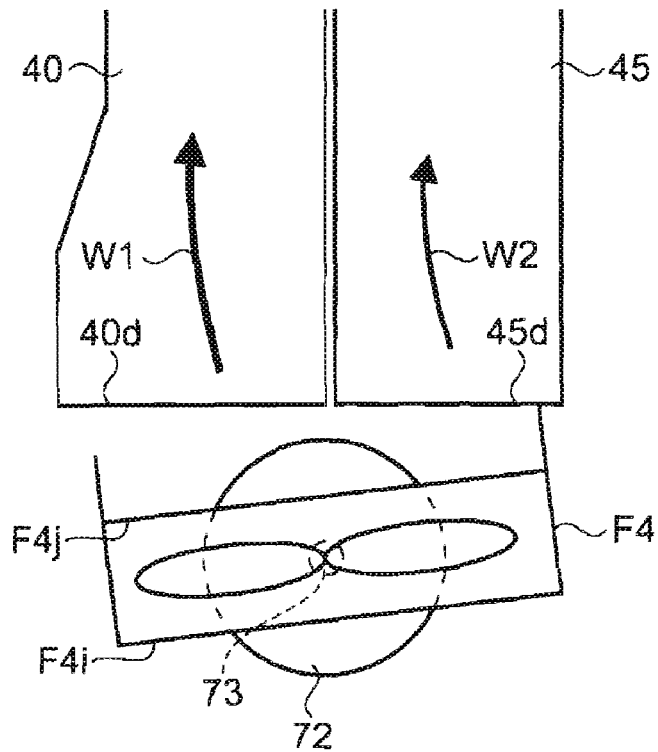
FIG. 5B is a diagram illustrating another aspect of a distributing unit when high luminance is set.
Figure 6A:
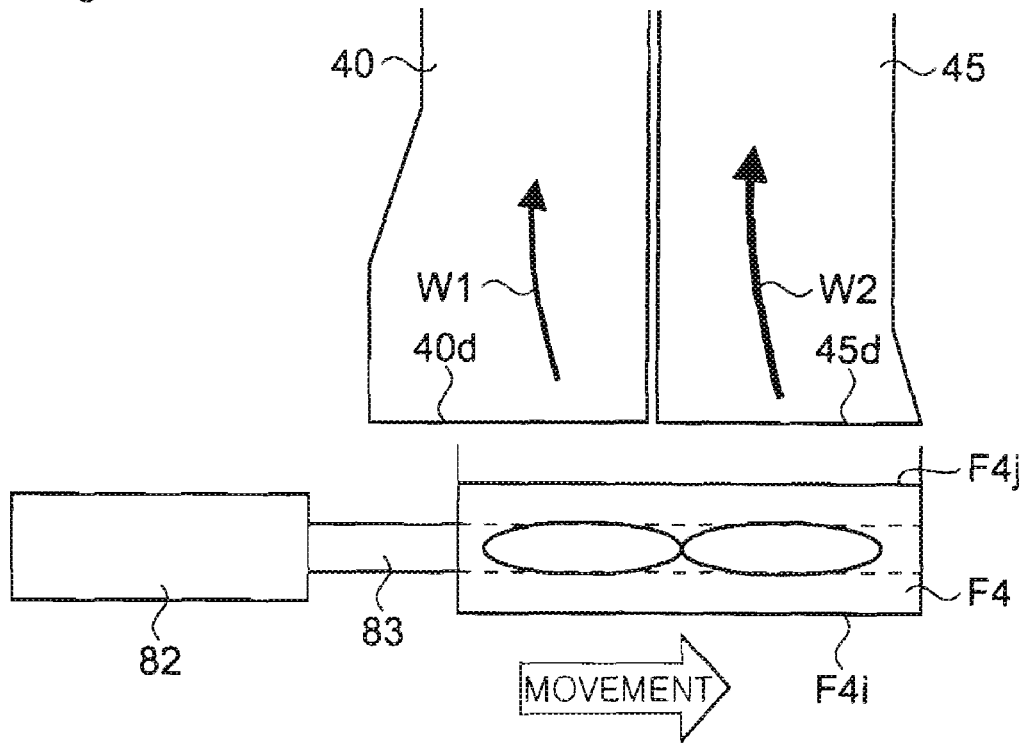
FIG. 6A is a diagram illustrating another aspect of a distributing unit when low luminance is set.
Figure 6B:
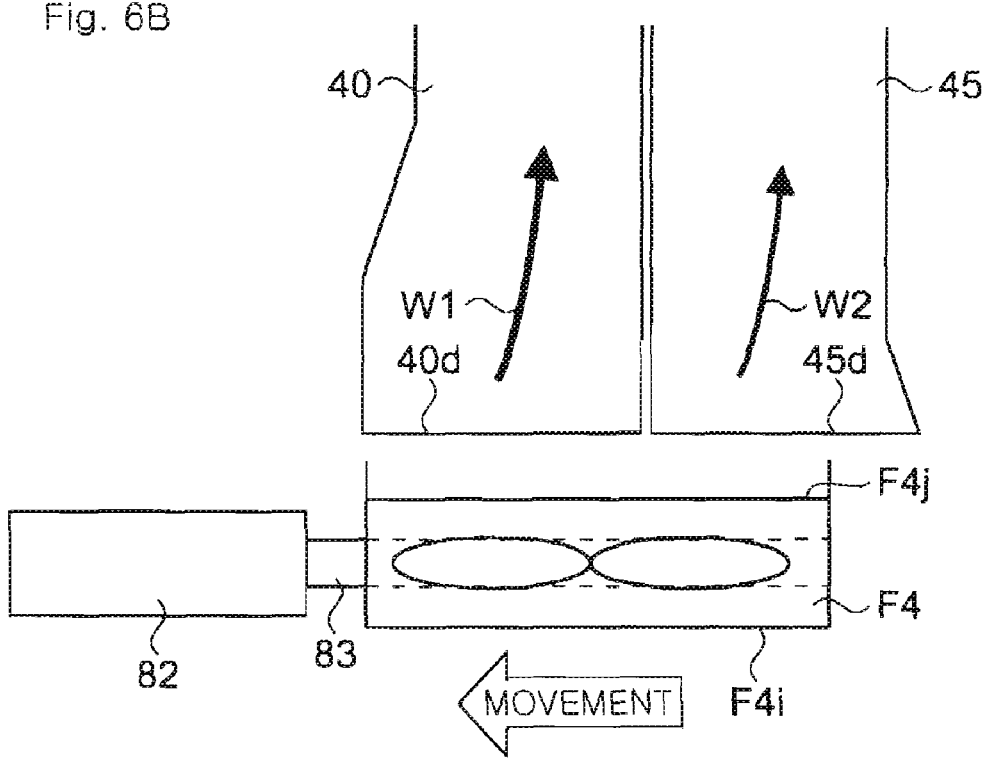
FIG. 6B is a diagram illustrating another aspect of a distributing unit when high luminance is set.

FIGS. 5A and 6A are diagrams illustrating different aspects of a distribution unit when low luminance is set. FIGS. 5B and 6B are diagrams illustrating different aspects of a distribution unit when high luminance is set. Hereinafter, the different aspects of the distribution unit in the projector 100 will be described with reference to FIGS. 5A, 5B, 6A and 6B, and with respect to FIG. 1.

The R solenoid 72 shown in FIGS. 5A and 5B is a distribution unit according to an aspect different from the aspect of the distribution unit according to the first embodiment, and is a rotary solenoid that adjusts a direction of the fan F4. Further, in order to discriminate the rotary solenoid according to the second embodiment and the rotary solenoid 65 of the louver 62 according to the first embodiment, the corresponding solenoid is referred to as the R solenoid 72, and is driven by the distribution adjusting unit 61.

The R solenoid 72 is disposed below the substantially central portion of the fan F4, and the rotation shaft 73 thereof is attached to the outer mounting member, such as a case of the fan F4. By using this structure, if the R solenoid 72 is driven by the distribution adjusting unit 61, the direction of the fan F4 is changed according to the rotation of the rotation shaft 73.

Specifically, when the theater mode is selected, the driving power applied to the discharge lamp 1 is decreased, and the luminance is decreased, the driving voltage of the fan F4 is decreased, the R solenoid 72 is driven, and the air blowing surface F4j of the fan F4 is oriented in a direction determined at the side of the lamp driving unit 45.

This state is shown in FIG. 5A. In this state, since the air blowing surface F4j of the fan F4 is toward the side of the lamp driving unit 45, the air volume in the cooling air W2 of the lamp driving unit 45 becomes larger than the air volume in the cooling air W1 of the power supply unit 40.

Similarly, FIG. 5B shows an aspect of an R solenoid 72 when a dynamic mode is selected.

When the dynamic mode is selected, the driving power applied to the discharge lamp 1 is increased, and the luminance is increased, the driving voltage of the fan F4 is increased, and the air blowing surface F4j of the fan F4 is oriented in a direction determined at the side of the power supply unit 40. Further, the determined direction is defined by driving data and parameters in accompanied data stored in the storage unit 54, and this information is previously set at a design stage on the basis of the temperature characteristics of the power supply unit 40 and the lamp driving unit 45.

In this state, since the air blowing surface F4j of the fan F4 is toward the side of the power supply unit 40, the air volume in the cooling air W1 of the power supply unit 40 becomes larger than the air volume in the cooling air W2 of the lamp driving unit 45.

The linear actuator 83 shown in FIGS. 6A and 6B is a distribution unit according to an aspect that is different from the aspects of the distribution unit according to the first embodiment and the above-described R solenoid 72, and moves the location of the fan F4 along the surface facing the lamp driving unit 45 and the power supply unit 40. Further, the linear actuator 82 is driven by the distribution adjusting unit 61.

The linear actuator 82 is disposed along a horizontal direction of the fan F4, and a rod 83 thereof is attached to an outer mounting member, such as a case of the fan F4. By using this structure, if the linear actuator 82 is driven by the distribution adjusting unit 61, the location of the fan F4 moves along the surface facing the power supply unit 40 and the lamp driving unit 45 according to expansion and contraction of the rod 83.

Specifically, when the theater mode is selected, the driving power applied to the discharge lamp 1 is decreased, and the luminance is decreased, the driving voltage of the fan F4 is decreased, the linear actuator 82 is driven, and the location of the fan F4 moves to the side of the lamp driving unit 45 by a predetermined length according to the movement of the rod 83.

This state is shown in FIG. 6A. In this state, since most of the air blowing surface F4j of the fan F4 is located at the side of the intake surface 45d of the lamp driving unit 45, the air volume in the cooling air W2 of the lamp driving unit 45 becomes larger than the air volume in the cooling air W1 of the power supply unit 40.

Similarly, FIG. 65B shows an aspect of a linear actuator 82 in a case where a dynamic mode is selected.

When the dynamic mode is selected, the driving power applied to the discharge lamp 1 is increased, and the luminance is increased, the driving voltage of the fan F4 is increased, the linear actuator 82 is driven, and the location of the fan F4 moves to the side of the power supply unit 40 by a predetermined length. Further, the predetermined length is defined by driving data and parameters in accompanied data that is stored in the storage unit 54, and this information is previously set at a design step on the basis of the temperature characteristics of the power supply unit 40 and the lamp driving unit 45.

In this state, since most of the air blowing surface F4j of the fan F4 is located at the side of the intake surface 40d of the power supply unit 40, the air volume in the cooling air W1 of the power supply unit 40 becomes larger than the air volume in the cooling air W2 of the lamp driving unit 45.

As described above, according to the second embodiment, in addition to the effects according to the first embodiment, the following effects can be obtained.

First, since the distribution unit is the R solenoid 72 when the R solenoid 72 is driven, it is possible to change the air volume of the cooling air that is distributed to each of the lamp driving unit 45 and the power supply unit 40.

Accordingly, it is possible to provide the simplified projector 100 that is capable of cooling down the plurality of heat emission portions with high energy utilization efficiency.

Second, since the distribution unit is the linear actuator 82, when the linear actuator 82 is driven, it is possible to change the air volume of the cooling air that is distributed to each of the lamp driving unit 45 and the power supply unit 40.

Accordingly, it is possible to provide the simplified projector 100 that is capable of cooling doom the plurality of heat emission portions with high energy utilization efficiency.

Third Embodiment

Different Aspect of Distribution Unit

Figure 10:
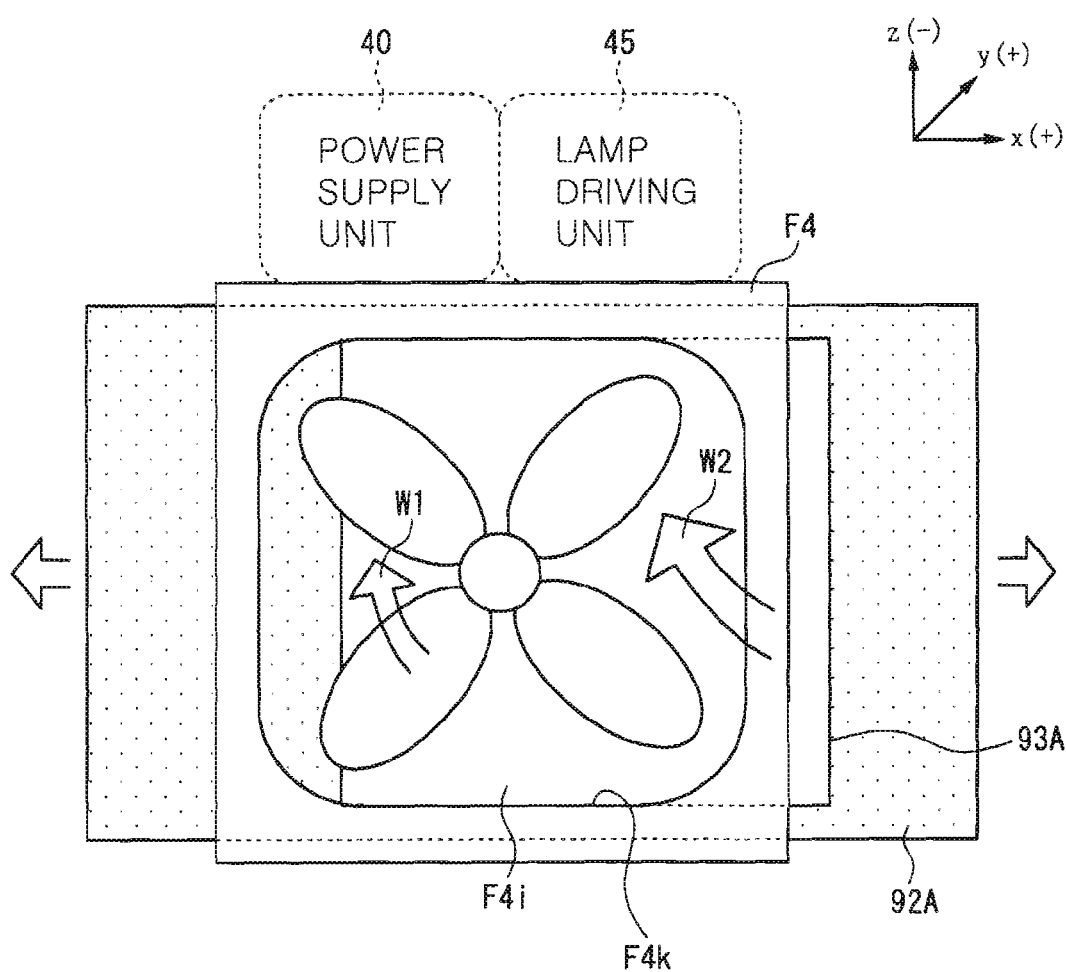
FIG. 10 is a side view in another aspect of a distributing unit according to a third embodiment of the invention.

FIG. 10 is a side view illustrating a different aspect of a distribution unit. Hereinafter, a different aspect of the distribution unit of the projector 100 will be described with reference to FIG. 10. FIG. 10 is a diagram illustrating a state of when a fan F4 is viewed from an intake surface F4i side.

A partition plate 92 shown in FIG. 10 is a distribution unit of an aspect that is different from the aspects of the distribution unit according to the first embodiment, the above-described R solenoid 72, and the above-described linear actuator 82. The partition plate 92 is provided between the lamp driving unit 45 and the power supply unit 40, and the fan F4, that is, on the side of the air blowing surface F4j. Further, at the substantially central portion of the partition wall 92, an opening 93 having a size that is substantially equal to the size of the air blowing surface F4j of the fan F4 is formed.

In the horizontal direction of the partition plate 92, a linear actuator (not shown) is disposed, and a rod of the linear actuator is attached to the partition plate 92. Further, the linear actuator is driven by the distribution adjusting unit 61.

Further, in this embodiment, the distribution unit includes the partition plate 92 and the linear actuator.

The linear actuator moves the partition plate 92 in the direction of the lamp driving unit 45 or the power supply unit 40, that is, a leftward-to-rightward direction (x-axis direction), along the surface facing the lamp driving unit 45 and the power supply unit 40. As a result, since the location of the opening 93 with respect to the fan F4 is varied, the partition plate 92 can change the size of the airflow orifice F4k of the fan F4.

Further, in this embodiment, the linear actuator moves the partition plate 92, but the invention is not limited thereto. For example, it may have a rack-and-pinion structure using a servomotor, a rack, and a pinion gear, and the servomotor may be driven by the distribution adjusting unit 61.

In the state shown in FIG. 10, in regards to the location of the partition plate 92, when a portion of the airflow orifice F4k of the fan F4 facing the lamp driving unit 45 is larger than a portion of the airflow orifice F4k of the fan F4 facing the power supply unit 40, a portion of the cooling air W1 distributed to the power supply unit 40 is distributed to the lamp driving unit 45. As a result, the air volume in the cooling air W2 distributed to the lamp driving unit 45 becomes larger than the air volume in the cooling air W1 that is distributed to the power supply unit 40.

Further, similarly, when the partition plate 92 moves to the side of the power supply unit 40, the air volume in the cooling air W1 of the power supply unit 40 can become larger than the air volume in the cooling air W2 of the lamp driving unit 45.

As described above, according to the third embodiment, in addition to the effects according to the first embodiment, the following effects can be obtained.

That is, since the distribution unit is the partition plate 92, when the partition plate 92 moves, is possible to change the air volume of the cooling air that is distributed to each of the lamp driving unit 45 and the power supply unit 40.

Accordingly, it is possible to provide the simplified projector 100 that is capable of cooling down the plurality of heat emission portions with high energy utilization efficiency.

Further, the invention is not limited to the above-described embodiments, and the various changes and modifications can be applied to the above-described embodiments. The modifications will be described below.

First Modification

Figure 7:
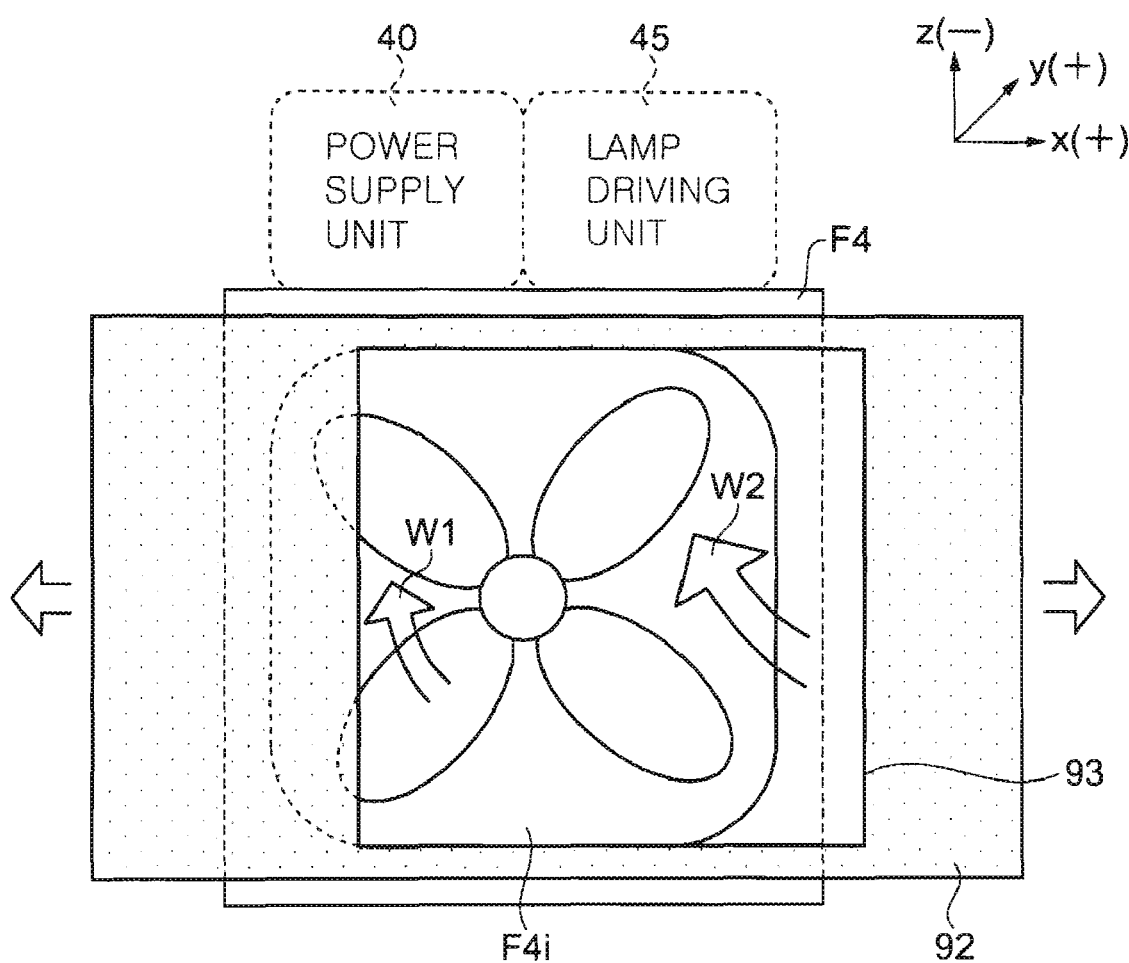
FIG. 7 is a side view in another aspect of a distributing unit.
Figure 8:
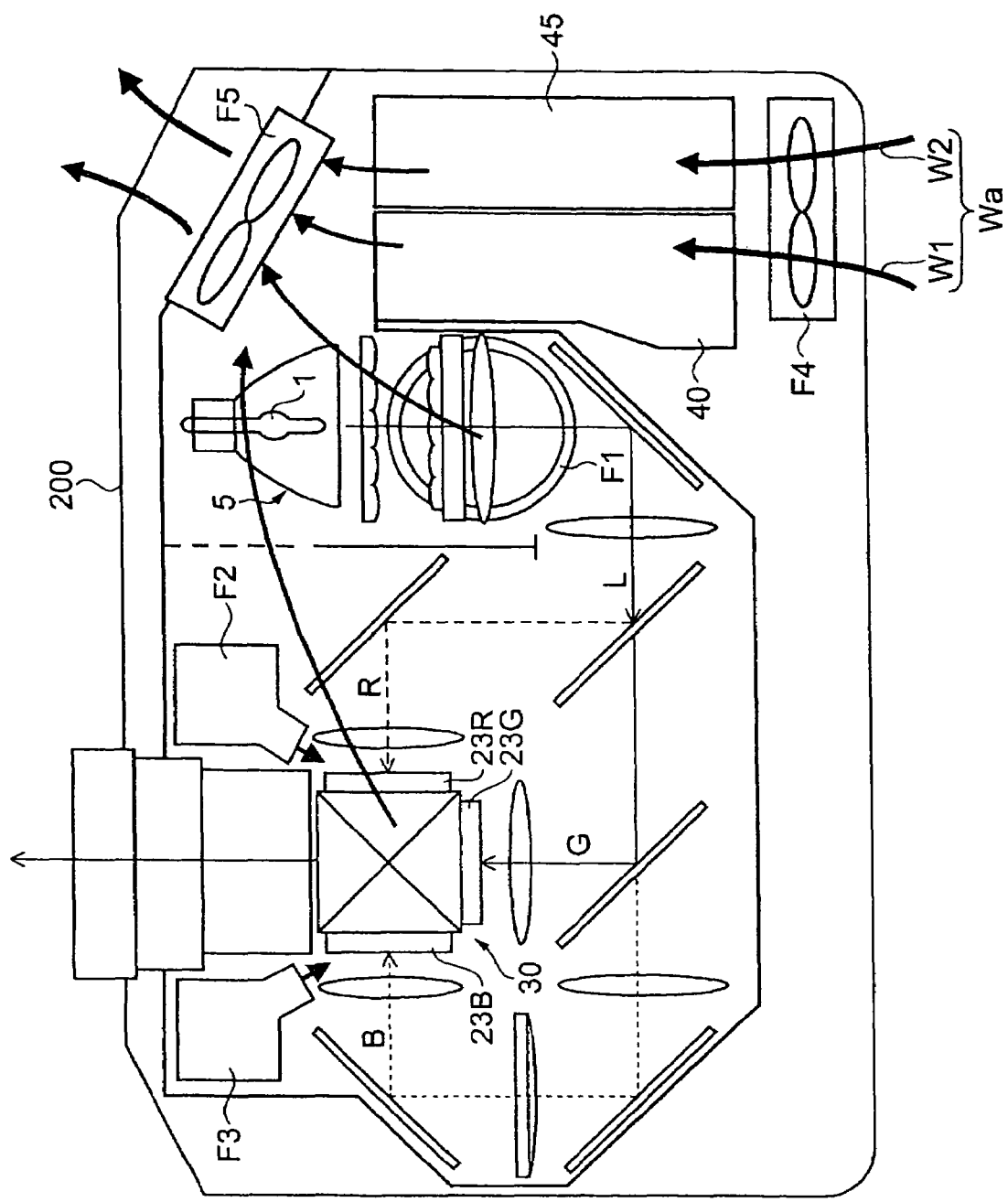
FIG. 8 is a schematic plan view illustrating a cooling structure as a main body in a projector according to the related art.

The first modification will be described with reference to FIG. 7. In third embodiment, the partition plate 92 is provided between the lamp driving unit 45 and the power supply unit 40, and the fan F4, that is, on the side of the air blowing surface F4j. However, the partition plate 92 may be provided on the side of the intake surface F4i.

Even in this structure, it is possible to obtain the same function and effect as the third embodiment.

Second Modification

The second modification will be described with reference to FIG. 1. In the above-described embodiments, the projector 100 has been described as the liquid crystal three-plate-type projective projector that uses the three liquid crystal light valves 23R, 23G, and 23b as the light modulating elements. The invention is not limited thereto, but the projector 100 may be a projector that includes the discharge lamp 1.

For example, the projector may have a structure in which the color filters for red, green, and blue are regularly disposed in a matrix, and a single-plate liquid crystal light valve capable of emitting full-color modulation light by a single plate is used. Further, the projector may have a structure that uses a reflective liquid crystal display device or a tilt-mirror device. Furthermore, the projector may be a rear-projection type that includes the light modulating elements and the screen.

Even in this structure, it is possible to obtain the same function and effect as the above-described embodiments and the modifications.

Third Modification

The third modification will be described with reference to FIGS. 1 and 4. In the first embodiment, in the projector 100, a temperature detecting unit including a temperature sensor is additionally provided which measures the temperature for each of the power supply unit 40 and the lamp driving unit 45, and in the storage unit 54, the temperatures measured by the respective temperature sensors, and a driving voltage adjusting table that defines optimal driving voltages of the fan F4 corresponding to the temperatures are stored.

According to this structure, even when the temperature states of the power supply unit 40 and the lamp driving unit 45 become the temperature states different from those in the graph m shown in FIG. 4 due to the temperature states around the projector 100, a cooling process by an optimal driving voltage can be made according to the measured temperature states of each portion. Further, it is possible to use a structure in which the temperature sensors are disposed in other heat emission portions, such as the light source unit 5, and the corresponding cooling fans F1 to F3 are cooled down with the optimal driving voltages.

Fourth Modification

The fourth modification will be described with reference to FIG. 2. In the above-described embodiments, the fan F4 blows the cooling air to the power supply unit 40 and the lamp driving unit 45. However, in contrast, the fan F4 may suck the air having absorbed the heat emitted from the power supply unit 40 and the lamp driving unit 45 and exhaust the air.

Further, in the above-described embodiments, the power supply unit 40 and the lamp driving unit 45 are disposed to be adjacent to each other, but may be disposed to be spaced apart from each other. Further, the distribution unit uses any one of the louver 62, the R solenoid 72, the linear actuator 82, and the partition plate 92, but may use another structure, that is, a duct changing the direction of the cooling air from the fan. If necessary, the air volumes of the cooling airs by the far F4 can be distributed to the power supply unit 40 and the lamp driving unit 45, and the air volumes of the cooling airs distributed to the power supply unit 40 and the lamp driving unit 45 can be changed.

The entire disclosure of Japanese Patent Application No. 2007-001452, filled Jan. 9, 2007 is expressly incorporated by reference herein.

What is claimed is:

1. A projector comprising:
    a light source unit that emits light;
    a lamp driving unit that supplies a driving power to the light source unit;
    a power supply unit that supplies a power to at least the lamp driving unit;
    a fan that circulates cooling air to the lamp driving unit and the power supply unit;
    a distribution unit that distributes air volumes of the cooling air by the fan to the lamp driving unit and the power supply unit, and independently changes the air columns of the cooling air respectively distributed to the lamp driving unit and the power supply unit; and
    a distribution control unit that performs driving control on the distribution unit so as to change the air volumes of the cooling air distributed to the lamp driving unit and the power supply unit in accordance with the driving power supplied to the light source unit.

2. The projector according to claim 1,
    the distribution control unit performing driving control on the distribution unit such that the air volume of the cooling air distributed to the power supply unit is increased when the driving power is increased.

3. The projector according to claim 1,
    the lamp driving unit and the power supply unit being disposed to be adjacent to each other,
    the fan being disposed to face the lamp driving unit and the power supply unit, and
    the distribution unit being a louver that has a plurality of louver boards and is disposed between the lamp driving unit and the power supply unit and the fan, and changes directions of the plurality of louver boards so as to change the air volumes of the cooling air.

4. The projector according to claim 1,
    the lamp driving unit and the power supply unit being disposed to be adjacent to each other,
    the fan being disposed to face the lamp driving unit and the power supply unit,
    the distribution unit being a rotary solenoid that changes a posture of the fan, and when the rotary solenoid is driven, the air volumes of the cooling air being changed.

5. The projector according to claim 1,
the lamp driving unit and the power supply unit being disposed to be adjacent to each other,
the fan being disposed to face the lamp driving unit and the power supply unit,
the distribution unit being a linear actuator that moves a location of the fan along a surface facing the lamp driving unit and the power supply unit, and
when the linear actuator is driven, the air volumes of the cooling air being changed.

6. The projector according to claim 1,
the lamp driving unit and the power supply unit being disposed to be adjacent to each other,
the fan being disposed to face the lamp driving unit and the power supply unit,
the distribution unit being a partition plate that is disposed between the lamp driving unit and the power supply unit and the fan, and moves along a surface facing the lamp driving unit and the power supply unit to change a size of an airflow orifice of the fan, and
when the partition plate moves, the air volumes of the cooling air being changed.

7. The projector according to claim 1, further comprising:
a fan that cools down the light source unit;
a fan that cools down a light modulating unit that modulates light emitted from the light source unit into modulation light displaying an image; and
a fan that discharges air, which is blown by the plurality of fans and absorbs heat emitted from the respective units, to the outside.

* * * * *